United States Patent [19]

Wengrovius et al.

[11] Patent Number: 5,034,489
[45] Date of Patent: Jul. 23, 1991

[54] SILICONE COPOLYMERS HAVING TETRAORGANODISILYLOXY GROUPS AND INTERMEDIATES THEREOF

[75] Inventors: Jeffrey H. Wengrovius, Scotia; Virginia M. Van Valkenburgh, Albany; Jonathan D. Rich, Rexford, all of N.Y.; Siegfried H. Schroeter, deceased, late of Schenectady, N.Y., by Henry C. Lockwood, legal representative

[73] Assignee: General Electric Company, Schenectady, N.Y.

[21] Appl. No.: 433,814

[22] Filed: Nov. 9, 1989

[51] Int. Cl.$^5$ .............................................. C08G 77/06
[52] U.S. Cl. ...................................... 528/21; 528/23; 528/26; 528/28; 528/37
[58] Field of Search .................... 528/23, 26, 28, 37

[56] References Cited

U.S. PATENT DOCUMENTS 4,618,666 10/1986 Porte ..................................... 528/33

OTHER PUBLICATIONS

M. Kumada, M. Yamaguchi, Y. Yamamoto, J. Nakajima and K. Shina, Synthesis of Some Methyldisilanes Containing Functional Groups, J. Org. Chem. (1956) (21), pp. 1264–1268.

Cleavage of Methylpolysilanes with Bromine and Iodine, Ulrich Stolberg (1963), p. 2798–2802, Chemical Abstracts 15304, vol. 59, Section e.

Preparation of Some Linear, Cyclic or Cagelike Methylsilicon Telomers having a Framework of SiSiO, M. Kumada et al., (1963), pp. 637–641, Chemical Abstracts 15304, vol. 59, Section h.

J. Chojnowski, J. Kuriata, S. Rubinsztain (2/10/88), Poly(oxymultisilane)s by Ring-Opening Polymerization Fully Methylated Silicon Analogues of Oxirane and THF Polymers.

*Primary Examiner*—Melvyn I. Marquis
*Attorney, Agent, or Firm*—William A. Teloi; James C. Davis, Jr.; William H. Pittman

[57] ABSTRACT

Silicone copolymers, such as silicone polyimides, silicone polyamides silicone polyesters and silicone polycarbonates are provided having condensed tetraorganodisiloxy groups. These silicone copolymers and anhydride or acylaromatic organic terminated intermediates are crosslinkable by heat or electron beam radiation.

9 Claims, No Drawings

SILICONE COPOLYMERS HAVING TETRAORGANODISILYLOXY GROUPS AND INTERMEDIATES THEREOF

BACKGROUND OF THE INVENTION

The present invention relates to silicone copolymers having chemically combined tetraorganodisilyloxy groups of the formula,

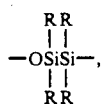  (1)

and intermediates for making such copolymers, where R is a member selected from the class consisting of the same or different monovalent $C_{(1-14)}$ hydrocarbon radicals and $C_{(1-14)}$ hydrocarbon radials substituted with monovalent radicals inert during equilibration.

Prior to the present invention, silicone cyclics having the formula

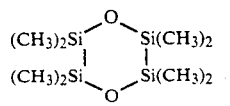  (2)

referred to hereinafter as "D'$_2$" were reported by Kumada et al., *Journal of Organic Chemistry*, 21, (1956), pp. 1264–68. Some linear, cyclic or cage-like methylsilicon telemers having a framework of

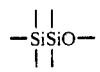

are also reported by Kumada et al., *Aogvo Kagaku Zasshi*, 66 (5), 1963, pp. 637–41. As shown by Porte, U.S. Pat. No. 4,618,666, methylsilicon resins having disilyloxy groups can be made by directly hydrolyzing methyl chlorosilane synthesis residue consisting of tetrachloro-1,2-dimethyldisilane, trimethyl-1,1,2-trichlorodisilane, tetramethyl-1,2-dichlorodisilane and dimethyldichlorosilane. The resulting metylsilicon resins have been found useful as molding powders, and as textile and waterproofing agents used in building construction.

SUMMARY OF THE INVENTION

The present invention is based on the discovery that incorporation of D'$_2$ of formula (2) with diorganodisiloxanes having acyl aromatic functional groups, such as silylarylacyl groups as shown by formula (3) below, and copending application of Davis et al., Ser. No. 07/319,027, filed Mar. 6, 1989, now U.S. Pat. No. 4,945,147, or silylaromatic anhydride groups, as shown by formula (4) below and Rich U.S. Pat. No. 4,794,153, both patents being incorporated herein by reference, can provide intermediates for making a variety of heat and electron beam curable silicone copolymers. These silicone copolymers, such as silicone polyimides, silicone polyamides, silicone polyesters and silicone polycarbonates can have an $\overline{Mn}$ of from about 15,000 to about 30,000.

STATEMENT OF THE INVENTION

There is provided by one aspect of the present invention, crosslinkable silicone copolymers selected from the class consisting of silicone polyimides, silicone polyesters, silicone polyamides, and silicone polycarbonates having chemically combined tetraorganodisilyloxy groups of formula (1).

In another aspect of the present invention, there is provided crosslinkable intermediates for making such silicone copolymers, such as polydiorganosiloxanes having condensed tetraorganodisilyloxy groups of formula (1), and terminal functional groups selected from acylaromaticorganicsiloxy groups of the formula,

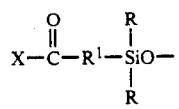  (3)

and aromatic anhydride siloxy groups of the formula,

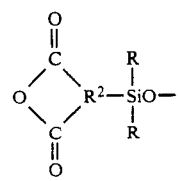  (4)

where R is as previously defined, $R^1$ and $R^2$ are selected from $C_{(6-14)}$ aromatic organic radicals, and X is a radical such as halogen, alkoxy, aryloxy and hydroxyaryloxy. As taught in copending application of Rich et al., Ser. No. 07/319,025, filed Mar. 6, 1989, now U.S. Pat. No. 4,945,148, aromatic anhydride siloxy groups of formula (4) can be converted to the corresponding hydroxy arylimide group by using an aminophenol.

Radicals included within R of formula (1) are, for example, $C_{(1-8)}$ alkyl radicals such as methyl, ethyl, propyl, butyl, pentyl; alkenyl radicals such as vinyl, propenyl and cyclohexenyl; substituted alkyl radicals such as trifluoropropyl, cyanoethyl and cyanopropyl; $C_{(6-14)}$ aryl radicals such as phenyl, tolyl, xylyl, and halogenated derivatives thereof, such as nitrophenyl, and chlorophenyl.

Radicals included by $R^1$ are divalent aromatic organic radicals such as phenylene, xylylene and tolylene. Radicals included by $R^2$ of formula (4) are for example,

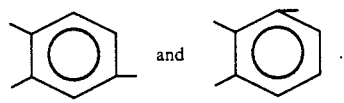 and

The silicone copolymer intermediates can be further defined as polydiorganosiloxane having terminal groups selected from formulas (3) or (4) and consisting essentially of diorganosiloxy units of the formula,

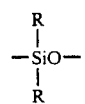  (5)

condensed with 0.1 to 100 mol percent of organodisilyloxy groups of formula (1), based on the total of condensed diorganosiloxy units and organodisilyloxy groups, where R is as previously defined.

The preferred silicone copolymer intermediates of the present invention can be made by equilibrating $D'_2$ of formula (2), or a mixture thereof with a cyclopolydiorganosiloxane, such as octamethylcyclotetrasiloxane ($D_4$) with a disiloxane "PADS" of the formula,

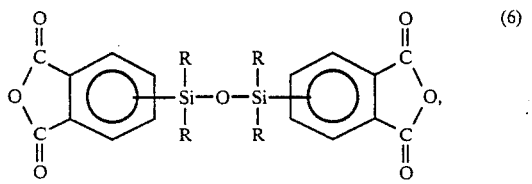

or a disiloxane of the formula

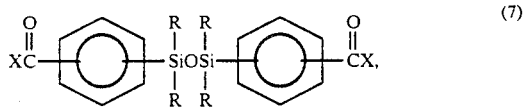

where R and X are as previously defined.

Equilibration is preferably effected in accordance with the procedure of Buese et al. copending application Ser. No. 261,450, filed Oct. 24, 1988, now U.S. Pat. No. 4,895,968, utilizing an effective amount of trifluoromethanesulfonic acid.

A preferred method for making the tetraorganodisilyloxy containing silicone polyimide copolymers of the present invention is by effecting reaction between the intermediate polydiorganosiloxane having terminal aromatic siloxy groups of formula (4) and consisting essentially of condensed diorganosiloxy units of formula (5), and tetraorganodisilyloxy groups of formula (1) or a mixture thereof with aromatic anhydride of the formula,

where $R^3$ is a tetravalent $C_{(6-40)}$ aromatic organic radical, with aromatic organic diamine of the formula, $$NH_2R^4NH_2 \qquad (9)$$

where $R^4$ is a $C_{(6-30)}$ divalent aromatic organic radical. Some of the aromatic organic diamines which are included within formula (9) are, for example, m-phenylenediamine, p-phenylenediamine, 4,4'-diaminodiphenylpropane, 4,4'-diaminodienediphenylmethane, benzidine, 4,4'-diaminodiphenyl sulfide, 4, 4'-diaminodiphenyl sulfone, 4,4'-diaminodiphenyl ether, 1,5-diaminonaphthalene, 3,3'-dimethylbenzidine, 3,3'-dimethoxybenzidine, 2,4-diaminotoluene, 2,6-diaminotoluene, 2,4-bis-($\beta$-amino-t-butyl)toluene, bis-(p-$\beta$-methyl-o-aminopentyl)benzene, 1,3-diamino-4-isopropylbenzene, 1,2-bis(4-aminopropoxy)ethane, m-xylylene diamine, and p-xylylenediamine.

There are included within the aromatic dianhydride of formula (8) compounds such as 2,2-bis[4-(3,4-dicarboxyphenoxy)phenyl]propane dianhydride, pyromellitic dianhydride, biphenyl dianhydride, and oxydiphthalic anhydride. Reaction can be effected in the presence of an inert organic solvent such as orthodichlorobenzene at a temperature in the range of from 100° C. to 350° C. A condensation catalyst such as methylaminopyridine can be used if desired. An optimum degree of crosslinking can be achieved with silicone polyimide copolymers having from about 0.1 to 100 mole percent of tetraorganodisilyloxy groups of formula (1) based on the total moles of condensed units in the silicone polyimide copolymer and preferably 5 to 20 mole percent of tetraorganodisilyloxy groups.

In addition to silicone polyimide copolymers, there also is provided by the present invention, tetraorganodisilyloxy containing silicone polyester copolymers and tetraorganodisilyloxy containing silicone polyamide copolymers utilizing polydiorganosiloxane having terminal haloacylaromatic organic siloxy groups of formula (3). These silicone copolymers, such as silicone polyamides can be made by effecting reaction between the intermediate having terminal formula (3) groups with aromatic organic diamine of formula (9). Aromatic dihydricphenols of the formula $$HOR^5OH \qquad (10)$$

also can be used in combination with the intermediate having formula (3) terminal groups, to form silicone polyester copolymers having condensed tetraorgano groups of formula (1), where $R^5$ is a $C_{(6-30)}$ divalent aromatic organic radical.

Aromatic dihydric phenols included within formula (10) are for example, 2,2-bis-(2-hydroxyphenyl) propane, 2,4'-dihydroxybi-phenylmethane, bis-(hydroxyphenyl) methane, 2,2-bis-(4-hydroxyphenyl) propane, referred to hereinafter as "bisphenol A" or 'BPA', 1,1-bis(4-hydroxyphenyl)ethane, 1,1bis(4-hydroxyphenyl)-propane, 4,4'-dihydroxybiphenyl, 4,4'-dihy-droxy-3,3',5,5'-tetramethylbiphenyl, 2,4-dihydroxybenzophenone, 4,4'-dihydroxydiphenylsulfone, 2,4-dihydroxydiphenylsulfone, 4,4-dihydroxydiphenylsulfoxide and 4,4'-dihydroxydiphenylsulfide, tetramethylbisphenol, 1,1-dichloro-2,2-bis-(4-hydroxyphenyl)ethylene, 6,6'-dihydroxy-3,3,3', 3'-tetramethyl-bis-1,1'-spiroindane,

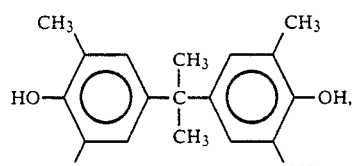

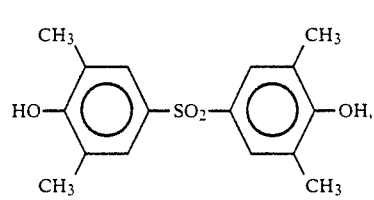

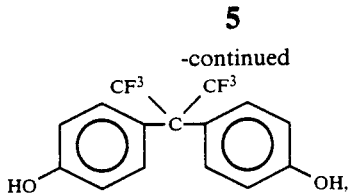

In addition to silicone polyimides, silicone polyesters, and silicone polyamides, silicone polycarbonates can be made from the phosgenation of tetraorganodisiloxy intermediates having terminal hydroxyaryl siloxy groups such as

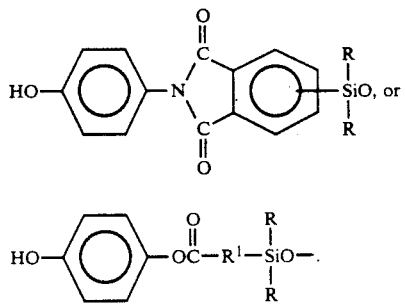

Crosslinking or cure of the tetraorganodisilyloxy containing silicone polymers of the present invention can be achieved at temperatures in the range of from 150° C. to 300° C. for 0.5 to 20 minutes, depending upon the concentration of the tetraorganodisilyloxy groups and the thickness of the copolymer sample. Cure also can be effected utilizing electron beam treatment utilizing a standard dose such as 20 to 40 megarads.

The crosslinkable silicone polyimides, polyesters, polyamides, or polycarbonates of the present invention can be used as high temperature, solvent resistant wire and cable coatings and as liquid injection moldable materials.

In order that those skilled in the art will be better able to practice the present invention, the following examples are given by way of illustration and not by way of limitation. All parts are by weight.

EXAMPLE 1

In accordance with the procedure of Kumada et al. cited above, 50 grams (0.267 mole) of a methylchlorosilane residue material having 85% by weight of tetramethyldichlorodisilane in 100 ml diethylether was added dropwise to a mixture of 400 ml of water saturated with sodium chloride and 400 ml of diethylether. The reaction mixture was cooled with a sodium chloride/ice bath. There was added to the sodium chloride ether mixture a 1 normal sodium hydroxide solution which was with neutralized HCl. The pH was monitored with methyl orange. The ether layer was then separated and washed with water. The solvent was then removed in vacuo yielding oily white crystals. The product was distilled under nitrogen (180°-185° C.) yielding 28 grams of a white crystalline product having a melting point of 40° C. Based on method of preparation and GC analysis, the product was a silicone cyclic as shown by formula (2) ($D'_2$).

A neat mixture of 26.75 grams (90.4 millimoles) of octamethylcyclotetrasiloxane and 6.82 grams (25.9 millimoles) of $D'_2$ was heated under nitrogen until the $D'_2$ melted. There was then added to the mixture 0.1 mole percent, based on the total moles of dimethylsiloxy and dimethyldisilyloxy groups of tetrafluoromethanesulfonic acid (triflic acid). Care was taken to add the triflic acid directly into the silicone cyclics by use of a syringe. The mixture became viscous and was further heated to 130° C. There was then added 10 grams (23.5 millimoles) of tetramethyldiphthalic anhydride disiloxane (PADS) to the mixture over a period of one hour. The reaction mixture was heated for 15 hours at 130° C. While still heating the mixture, a large excess of magnesium oxide was added to the mixture which was stirred for an additional hour. The mixture was filtered and a small amount phthalic anhydride and unreacted cyclics were removed by vacuum distillation. Based on method of preparation, and liquid chromotography there was obtained a polydimethylsiloxane having an average of about 15 dimethylsiloxy units and 2 tetramethyldisilyloxy units terminated with dimethylphthalic anhydride siloxy units.

EXAMPLE 2

A mixture of 14.41 grams (8.142 millimoles) of the phthalic anhydride terminated tetramethyldisilyloxy containing polymer of Example 1, 6.79 grams (13.06 millimoles) of 2,2-bis[4-(3,4-dicarboxyphenoxy)phenyl]-propane dianhydride (BPADA), 2.34 grams (21.63 millimoles) of metaphenylenediamine, 0.127 grams (0.86 millimoles) of phthalic anhydride chainstopper, 0.11 grams (0.874 millimoles) of methylaminopyridine and 277 grams of orthodichlorobenzene was refluxed with stirring for 2 hours under nitrogen. Water of imidization and 142 grams of orthodichlorobenzene were collected by azeotropic distillation. The reaction mixture was heated an additional 6 hours. After cooling, the product was precipitated in methanol using a blender. The product was dissolved in chloroform and reprecipitated into methanol. There was obtained an 80% yield of a silicone polyimide copolymer having an $\overline{Mn}$ of 23,983, and an 8.5 mole percent of tetramethyldisilyloxy groups based on method of preparation, GPC, and $^{29}Si$ NMR analysis.

EXAMPLE 3

In accordance with the procedure of Example 2, there was prepared a series of tetramethyldisilyloxy containing silicone polyimides utilizing the phthalic anhydride terminated polydimethylsiloxane of Example 1, (PADS) with either paraphenylenediamine (PPD) or metaphenylenediamine (MPD) and phthalic anhydride chain stopper. The following shows the average composition of the polymers prepared, where $D_{15}D'_2$ shows a mol ratio of 7.5 mols of dimethylsiloxy, per mole of tetramethyldisilyloxy and PADS, BPADA, PPD, MPD and chainstopper are as previously defined:

Polymer #1: Random, 50 weight % silicone, PADS-$D_{15}D'_2$/BPADA/PPD, 2% chain stopper Polymer #2: Random, 50 weight % silicone, PADS-$D_{15}D'_2$/BPADA/MPD, 2% chain stopper Polymer #3: Random, 60 weight % silicone, PADS-$D_{15}D'_2$/BPADA/MPD, 2% chain stopper The physical properties and solubility (in CHCl$_3$) of these polymers were measured before and after crosslinking. Crosslinking was achieved by heating polymer strands for 10-20 hours at 200° C. Polyimide copolymers of nearly identical composition, except not containing any tetramethyldisilyloxy groups, did not crosslink after heating for many days at 200° C. This result indicates that the

bond is the thermally weakest bond in the copolymer. The following results were obtained:

| Description | WT % Si-Si | Tensile | Elongation | Solubility |
| --- | --- | --- | --- | --- |
| Polymer #1 | | | | |
| Not crosslinked | 8.5 | 1555 | 38 | yes |
| 10 h at 200° C. | 8.5 | 2068 | 42 | no |
| 20 H at 200° C. | 8.5 | 2378 | 45 | no |
| Polymer #2 | | | | |
| Not crosslinked | 8.5 | 1620 | 73 | yes |
| 10 h at 200° C. | 8.5 | 2539 | 81 | no |
| Polymer #3 | | | | |
| Not crosslinked | 11 | 1115 | 183 | yes |
| 12 h at 200° C. | 11 | 1638 | 178 | no |

These results clearly show that silicone polyimides containing

bonds can be processed and subsequently crosslinked by mild thermal treatment. Crosslinking results in improved solvent resistance, improved tensile strength, and constant elongation. High strength, solvent resistant materials can be prepared with high silicon contents.

EXAMPLE 4

Additional silicone polyimides were prepared following the procedure of Example 2, which were subjected to electron beam radiation utilizing a standard dose of 20 megarads. The degree of crosslinking was determined by a gel test in which each sample was weighed before and after being extracted by chloroform for 20 hours. The silicone polyimide copolymers were pressed into films about 10 mils thick prior to irradiation. The following results were obtained, where the term "polymer" shows weight percent silicon based on the molecular weight of the copolymer and the amount of condensed silicon containing siloxy units in the copolymer, while weight percent "Si-Si" was based on the weight of tetramethyldisilyloxy groups initially employed.

| Polymer | WT % Si-Si | Dose | Gel Test % |
| --- | --- | --- | --- |
| 44% Si/PADS-D$_{15.5}$/PPD | 0 | 20 | 13 |
| 44% Si/PADS-D$_{13}$D'$_1$/PPD | 6.5 | 20 | 62 |
| 44% Si/PADS-D$_9$D'$_2$/pPD | 13 | 20 | 44 |
| 44% Si/PADS-D$_7$D'$_{3.5}$/PPD | 19 | 20 | 57 |
| 44% Si/PADS-D$_{15.5}$/PPD | 0 | 40 | 44 |
| 44% Si/PADS-D$_{13}$D'$_2$/PPD | 6.5 | 40 | 79 |
| 44% Si/PADS-D$_9$D'$_2$/PPD | 13 | 40 | 62 |
| 44% Si/PADS-D$_7$D'$_{3.5}$/PPD | 19 | 40 | 70.5 |
| 55% Si/PADS-D$_{15.5}$/PPD | 0 | 20 | 18 |
| 55% Si/PADS-D$_{15}$D'$_2$/MPD | 10.2 | 20 | 54 |
| 60% Si/PADS-D$_{15.5}$/PPD | 0 | 20 | 40 |
| 60% Si/PADS-D$_{15}$D'$_2$/MPD | 11.5 | 20 | 76 |

These results illustrate the amount of crosslinking is significantly increased when

groups are present.

Although the above examples are directed to only a few of the very many variables which can be used to make the crosslinkable silicone copolymers of the present invention, and intermediates used to make such copolymers, it should be understood that a much broader variety of such copolymers and intermediates can be made as shown in the description preceding these examples.

What we claim as new and desire to secure by Letters Patent of the United States is:

1. A crosslinkable silicone copolymer selected from the class consisting of silicone polyimides, silicone polyesters, silicone polyamides and silicone polycarbonates having chemically combined tetraorganodisilyloxy groups of the formula,

where R is a member selected from the class consisting of the same or different monovalent C$_{(1-4)}$ hydrocarbon radicals and C$_{(1-14)}$ hydrocarbon radials substituted with monovalent radicals inert during equilibration.

2. A silicone polyimide in accordance with claim 1.
3. A silicone polyester in accordance with claim 1.
4. A silicone polyamide in accordance with claim 1.
5. A silicone polycarbonate in accordance with claim 1.
6. A silicone copolymer in accordance with claim 1, where R is methyl.
7. Polydiorganosiloxane having condensed tetraorganodisilyloxy groups of the formula,

and terminal functional groups selected from acyl aromatic organicsiloxy groups of the formula

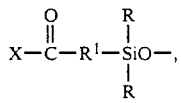

and aromatic anhydride siloxy groups of the formula,

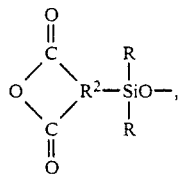

where R is a member selected from the class consisting of the same or different monovalent C$_{(1-4)}$ hydrocarbon radicals and $C_{(1-14)}$ hydrocarbon radials substituted with monovalent radicals inert during equilibration, $R^1$ and $R^2$ are selected from $C_{(6-14)}$ aromatic organic radicals, and X is a radical selected from halogen, alkoxy, aryloxy and hydroxyaryloxy.

8. A polydimethylsiloxane in accordance with claim 7 having condensed tetramethyldisilyloxy groups and terminal chlorocarboxyphenyldimethylsiloxy units.

9. A polydimethylsiloxane in accordance with claim 7 having condensed tetramethyldisilyloxy groups and terminal phthalic anhydridedimethylsiloxy groups.

* * * * *

UNITED STATES PATENT AND TRADEMARK OFFICE
CERTIFICATE OF CORRECTION

PATENT NO. : 5,034,489
DATED : 7/23/91
INVENTOR(S) : Jeffrey H. Wengrovius, et al It is certified that error appears in the above-identified patent and that said Letters Patent is hereby corrected as shown below:

On the title page, before item [57] Abstract, the Attorney Agent, or Firm, cancel "William A. Teloi" and substitute --William A. Teoli--.

Signed and Sealed this

Fifth Day of January, 1993

*Attest:*

DOUGLAS B. COMER

*Attesting Officer*       Acting Commissioner of Patents and Trademarks